May 20, 1924. Re. 15,842

W. P. WHITE

CLOSURE

Original Filed July 11, 1913

INVENTOR
William P. White
BY
George Ramsey.
ATTORNEY

Reissued May 20, 1924. Re. 15,842

UNITED STATES PATENT OFFICE.

WILLIAM P. WHITE, OF BROOKLYN, NEW YORK, ASSIGNOR TO ANCHOR CAP & CLOSURE CORPORATION, OF BROOKLYN, NEW YORK, A CORPORATION OF NEW YORK.

CLOSURE.

Original No. 1,134,069, dated March 30, 1915, Serial No. 778,486, filed July 11, 1913. Application for reissue filed April 15, 1918. Serial No. 228,775.

*To all whom it may concern:*

Be it known that I, WILLIAM P. WHITE, a citizen of the United States, residing in the city of Brooklyn, county of Kings, State of New York, have invented certain new and useful Improvements in Closures, of which the following is a specification.

This invention relates to closures for the purpose of sealing containers in the form of bottles or jars in order to preserve the contents thereof.

One object of the invention is to provide a simple closure which may be easily applied to a bottle or jar and which will effect a hermetic seal; another object is to provide a closure which will effect such a seal even though it may be carelessly applied to the container; another object is to provide a closure which may be held upon the container either by atmospheric pressure or by a mechanical clamp.

A still further object of the present invention is an article of manufacture comprising a package sealed by atmospheric pressure and comprising a closure having a skirt extending over a portion of the side wall of the container in such manner that atmospheric pressure on the closure pulls the skirt of the closure inwardly over the mouth of the container.

A still further object of the present invention is an article of manufacture comprising a package as specified and wherein a gasket is arranged between the skirt of the cap and the side wall of the container in such manner that atmospheric pressure draws the gasket material over the edge of the container to form a hermetic seal.

A still further object of the present invention is an article of manufacture comprising a package of the character specified wherein atmospheric pressure on the top of the closure cups the central portion thereof and draws inwardly a portion of the closure over the mouth of the container whereby a hermetic seal is formed between the skirt of the closure and the side wall of the mouth of the container.

Still other objects will appear in the following specification and claims.

Figure 1:
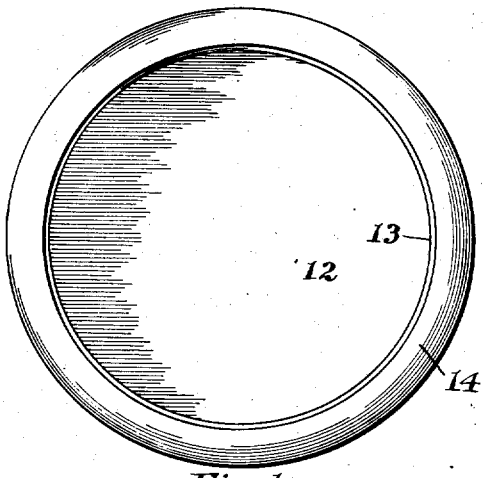
Figure 2:
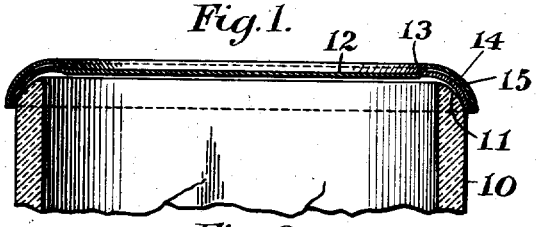
Figure 3:
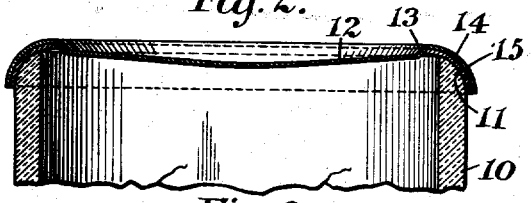

Referring to the drawings: Figure 1 represents a plain view of the closure. Fig. 2 represents an elevation of the closure and part of the container in section showing how the cap is applied; Fig. 3 is a similar view to Fig. 2 showing the cap sealed in position by atmospheric pressure; and Fig. 4 is a sectional elevation showing the cap held in place by the mechanical clamp.

Figure 4:
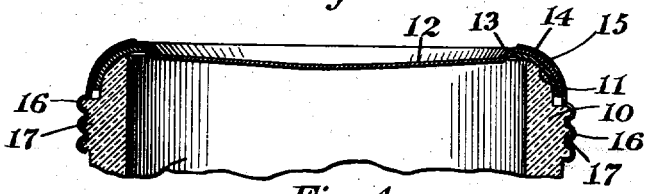

The container 10 as shown in Figs. 2, 3, and 4 is preferably of glass or vitreous material and has its upper edge 11, where the seal is made, formed into a portion of a spherical surface, this surface being a spherical zone. The closure is shown at 12 having a shoulder 13 and a curved outer part 14. Within the part 14 and bearing against the shoulder 13 is a packing gasket 15 of any suitable sealing material. The curvature of the part 14 is such that when the cap is sprung over the spherical zone of the container as shown in Fig. 3, it assumes a position concentric with the zone; the outer extremity of the curved part 14 as indicated in Fig. 2 is normally somewhat contracted so that the curve does not represent a spherical zone before pressure is applied to the cap. The resilience of the cap is sufficient, however, to stretch outward the outer edge of part 14 so that when the cap and gasket 15 are sealed upon the part 11 of the container, all three parts, 11, 14 and 15, are concentric with one another.

When the cap is applied and the package is sealed under a vacuum as indicated in Fig. 2 the atmospheric pressure forces down the central part of the cap and causes a direct downward pressure upon the container at the upper part of the sealing zone.

The downward atmospheric pressure on the central part of the cap cups this portion of the cap and because of the resilience specified the part 14 or upper portion of the skirt of the cap, is drawn inwardly toward the middle of the cap; this action draws the gasket 15 inwardly and over the edge of the container and compresses the gasket tightly between the cap and wall of the mouth of the container. Furthermore, resilience and shape of the cap is such that it conforms to irregular glass and eliminates the possibilities of improper seals on tumblers or containers that are slightly out of round. Pressure is also brought to bear by the cap upon the container at the lower part of the zone due to the springing of the cap over this part of the container. These two forces combined cause a pressure to be distributed over the entire breadth of the gasket 15, thereby making a very effective seal.

The shoulder 13 operates not only to hold the gasket 15 in place, but it also serves to center the cap upon the container to which it is applied. It will be noticed that as the contacting surfaces of the seal are all in the form of concentric spherical zones it does not matter whether the cap be applied squarely to the sealing surface of the container or not. Even if the cap be placed upon the container in a crooked position the surfaces will be concentric with each other (providing the skirt of the cap extends over the side wall of the container mouth) and will still effect a seal. As a result of this construction the capping operation may be performed in much less time and with much less care and attention than is required with the usual forms of closures.

The method of forming hermetic seals in accordance with my invention comprises providing a suitable container of glass or the like which has substantially incompressible side walls as shown at 10 in Figures 2 to 4 inclusive; then providing a cap of sufficiently resilient material to insure a certain amount of spring, or give, in the cap to enable the cap to more readily conform to the glass container, and which cap is provided with a depending skirt that extends downwardly over a portion of the side wall of the mouth of the container. Preferably gasket material is provided between the skirt of the cap and the mouth of the container in order to fill up irregularities between the said skirt and the said wall to prevent leakage of air under the cap, although it is possible to dispense with the gasket under certain conditions. After the cap has been placed in position on the mouth of the container a vacuum is established in the container by carrying out the sealing operation in a chamber from which the air may be exhausted. After the air is exhausted atmospheric pressure is gradually readmitted to the chamber and the atmospheric pressure on the cap pulls the upper portion of the skirt inwardly over the mouth of the container due to the cupping of the central portion of the cap. This action pulls the cap tightly against the mouth of the container and produces a slight relative movement between the cap and the side wall or mouth of the container whereby the gasket material is brought into very intimate contact with the edge or side wall of the container and the cap, thereby producing an effective hermetic seal. Under certain conditions it is desirable to use mechanical means to prevent the cap from being displaced from the mouth of the container when the air is being exhausted and to retain the cap seated in position when air is being readmitted to the sealing chamber.

The seal may also be effected by packing the goods hot and then placing the cap thereon and the vacuum formed on cooling of the goods is sufficient to seat and seal the cap on the container. Where hot packing is done it may be desirable to hold the cap in place by screw rings or the like.

In Fig. 4 the cap is shown in connection with a mechanical clamp which takes the form in this example of a threaded ring 16 which engages a thread 17 formed upon the container in a manner common to fruit jars in the prior art; in this case the cap 12 is applied to the container and the threaded ring 16 is screwed upon the container and thereby clamps the cap and gasket 15 in place to effect a seal. In this case, as in the other illustrations shown, it is immaterial whether or not the cap 12 be placed exactly central and square upon the container as the concentric parts will effect the seal whether the cap happens to be straight or askew.

While the preferred form of my invention has been shown and described for purposes of illustration I desire it to be understood that my invention may be included in, and practiced by use of, structures other than those specifically disclosed herewith.

What is claimed:

1. In combination, a container having a spherical zone sealing surface, a closure having a spherical zone sealing surface, the inner edge of the closure zone being formed into a centering shoulder and a gasket adapted to be interposed between the container and the closure.

2. In combination, a container having a spherical zone sealing surface, a closure having a spherical zone sealing surface, the inner edge of the closure zone being formed into a shoulder, a gasket adapted to be interposed between the container and the closure, and a screw clamp adapted to engage the closure and force it downward upon the container.

3. In combination, a container having a spherical zone sealing surface, a closure having a spherical zone sealing surface, the inner edge of the closure zone being formed into a shoulder, a gasket adapted to be interposed between the container and the closure, and a screw ring engaging threads upon the container and adapted when screwed down to engage the closure and force it downward upon the sealing lip of the container.

4. In combination, a container having a spherical zone sealing surface, a closure having a spherical zone sealing surface, the inner edge of the closure zone being formed into a shoulder, a gasket adapted to be interposed between the container and the closure, and a screw clamp having an annular portion concentric with the closure zone and adapted to engage the same.

5. In combination, a container having a sealing surface, a closure having a sealing surface which before exhausting the air from the container is only in partial engagement with the corresponding container sealing surface, the closure being flexible under the influence of a vacuum whereby the flexing of the closure materially increases the area of sealing engagement between the closure and container.

6. In combination, a container having a sealing zone, and a closure having a sealing surface which before exhausting the air from the container is only in partial engagement with the corresponding container sealing zone, the closure being flexible under the influence of a vacuum whereby the flexing of the closure materially increases the area of the sealing engagement between the closure and the container.

7. In combination, a container having a sealing zone, and a closure adapted to be seated on said sealing zone by producing a vacuum within the container, said closure having a sealing surface which is only in partial engagement with the container before the air is exhausted from the container, said closure also being flexible under air pressure when the vacuum is produced in the container to draw said surface into engagement with the sealing zone and to thereby increase the area of sealing engagement between the closure and the container.

8. In a package adapted to be sealed by exhausting the air therefrom, the combination of a container having a sealing zone, a closure having a circumferential depending portion adapted to fit over the mouth of said container, and a gasket between said circumferential depending portion of the closure and the container, the central portion of said closure being flexed below the upper end of the container wall and into said container under the influence of atmospheric pressure when the vacuum is maintained in said container to draw a part of said depending portion over the mouth of the container and thereby seat said gasket tightly against the sealing zone to form a hermetic seal between the container and the closure.

WILLIAM P. WHITE.